United States Patent [19] [11] 4,046,941
Saito et al. [45] Sept. 6, 1977

[54] SUPPORT SHEET WITH SENSITIZED COATING OF ORGANIC ACID SUBSTANCE AND ORGANIC HIGH MOLECULAR COMPOUND PARTICULATE MIXTURE

[75] Inventors: Toranosuke Saito, Kobe; Jujiro Kohno, Takatsuki; Daiichiro Tanaka, Arao; Shinichi Oda, Amagasaki, all of Japan

[73] Assignees: Sanko Chemical Company Ltd.; Kanzaki Paper Manufacturing Company, Ltd., both of Japan

[21] Appl. No.: 606,548

[22] Filed: Aug. 21, 1975

Related U.S. Application Data

[62] Division of Ser. No. 401,552, Sept. 27, 1973, Pat. No. 3,924,027.

[30] Foreign Application Priority Data

Sept. 27, 1972 Japan .................................. 47-97430

[51] Int. Cl.[2] ................................................ B32B 5/16

[52] U.S. Cl. .................................... 428/323; 428/328; 428/329; 428/331; 428/332; 428/404; 428/403; 428/407; 428/454; 428/500; 428/537; 427/146; 427/147; 427/150

[58] Field of Search ............... 428/411, 537, 500, 454, 428/404, 407, 403, 323, 329, 328, 331, 332; 427/146, 147, 150

[56] References Cited

U.S. PATENT DOCUMENTS

| | | | |
|---|---|---|---|
| 2,730,457 | 1/1956 | Green | 428/454 X |
| 3,322,557 | 5/1967 | Schwab | 427/150 X |
| 3,916,070 | 10/1975 | Ozutsumi et al. | 428/537 X |

*Primary Examiner*—P. C. Ives
*Attorney, Agent, or Firm*—McGlew and Tuttle

[57] ABSTRACT

A sensitized sheet for a pressure sensitive copy system is obtained by coating the surface of a support with an acceptor composition comprising a particulate mixture comprising an organic acid substance selected from the group consisting of aromatic carboxylic acids and polyvalent metal salts thereof, and an organic high molecular compound. The above coating composition may further contain an inorganic solid particle such as oxides, hydroxides and carbonates of a polyvalent metal, and other mineral pigments. The coating procedure may be carried out with use of coating means mounted on the conventional paper machines.

21 Claims, No Drawings

SUPPORT SHEET WITH SENSITIZED COATING OF ORGANIC ACID SUBSTANCE AND ORGANIC HIGH MOLECULAR COMPOUND PARTICULATE MIXTURE

This is a division of application Ser. No. 401,552, filed Sept. 27, 1973, now U.S. Pat. No. 3,924,027.

BACKGROUND OF THE INVENTION

The present invention relates to a sensitized sheet for use in a pressure sensitive copy system and particularly the sensitized sheet having a coating comprising an acceptor which is capable of color forming when coming into contact with a colorless chromogenic compound.

Generally, the pressure sensitive copy system utilizes a color forming reaction between an electron donating colorless compound and an electron accepting solid acid.

Various types of the pressure sensitive recording sheets are hitherto known. For example, U.S. Pat. No. 2,730,456 discloses a transfer type of the pressure sensitive recording sheets wherein an upper sheet or overlying sheet is coated with a layer containing microcapsules in which an electron donating colorless compound (hereinafter referred to as "color former") dissolved in an oily solvent is enveloped, and an underlying sheet is sensitized with a coating layer containing an electron accepting solid acid (hereinafter referred to as "acceptor"). The color former transfers into the underlying sheet upon rupture of the micro-capsules and forms a visible colored image on the underlying sheet. If multiple copies are desired, an intermediate sheet carrying the micro-capsules on one side and the acceptor on the other side is inserted between the upper sheet and the underlying sheet.

Also, U.S. Pat. No. 2,730,457 discloses a recording sheet wherein both of the fine capsules and acceptor are coated on the same side, so called "self contained copying sheet".

Furthermore, German Pat. No. 1,275,550 discloses a pressure sensitive recording sheet wherein a record forming components soluble in a liquid solvent is carried on the surface and/or inside of a support and said solvent is present isolated from at least one of said record forming components by pressure-rupturable capsules.

Examples of the color former include Leuco type of chromogenic compounds such as Crystal Violet Lactone, Benzoyl Leucomethylene Blue, Malachite Green Lactone, Rhodamine B Lactone, fluoran derivatives and spiropyranes.

Known acceptors include acid clay, activated clay, attapulgite, kaolin and other inorganic solid acids, but there are disadvantages that a developed color image is faded by the action of moisture and sunlight. A sensitive sheet coated with organic solid acid such as phenolic resins is also used. However such sheet is apt to yellow by the sunlight and the developed color image is decreased in dense or allowed to disappear for a little while by heat or moisture.

As another examples of the organic solid acid, aromatic carboxylic acids (U.S. Pat. Nos. 3,322,557 and 3,488,207) and polyvalent metal salts of aromatic carboxylic acid (DT-OS 2,152,765) are proposed. There are, for example, described benzoic acid, o-nitrobenzoic acid, o-chlorobenzoic acid, 4-methyl-3-nitrobenzoic acid, p-isopropylbenzoic acid, p-tert.-butylbenzoic acid, salicylic acid, 5-tert.-butylsalicylic acid, 3-cyclohexylsalicylic acid, 3-methyl-5-isoamylsalicylic acid, 3,5-dinitrosalicylic acid, 1-naphthoic acid, 1-hydroxy-2-naphthoic acid, 5,5'-methylen-disalicylic acid and the other similar aromatic carboxylic acids, and salts of metals such as magnesium, calcium, zinc, cadmium, aluminum, gallium, tin, lead, chromium, molybdenum, manganese, cobalt and nickel with the above carboxylic acids. Such aromatic carboxylic acids and polyvalent metal salts thereof are superior in stability toward the sunlight to the phenolic resins. some of the aromatic carboxylic acids and polyvalent metal salts thereof have a sublimating property, and therefore a sheet sensitized by a coating containing such acceptors loses a color-forming ability with the lapse of time. Since the said acceptors are relatively soluble in water and thus diffuse within the sheet by the action of high moisture or water, the color-forming ability is lost on the surface of the sheet. Such disadvantages show a increasing tendency as the molecular weight of aromatic carboxylic acid is lowered. The reason why salicylic acid was formerly proposed but not used in practice is that it has disadvantages as mentioned above as well as a weak point of lower color density. Some of aromatic carboxylic acids and polyvalent metal salts thereof show improved resistance toward heat and moisture as the molecular weight increases and can maintain relatively stable color-forming properties at the normal temperture and humidity. The pressure sensitive recording papers, however, leave room for further improvements of the properties to be required in practice. It is unavoidable that the recording papers are stored and handled under the condition of high humidity or water attaches directly to the sheet. For example, it often occurs that the rainwater or water split from a glass attaches to the sheet. In some cases, when a letter or figure is printed by offset printing on the upper or underlying sheet of pressure sensitive recording papers, fountain solution on the blanket transfers onto an acceptor coated surface of the sheet. Under such circumstance, if an organic acid substance has insufficient resistance toward high moisture or water, a sensitized sheet is markedly reduced in the color-forming ability or in case the sensitized sheet is in touch with a sheet carrying the encapsulated color former the organic acid substance comes into contact with the color former by means of the moisture or water as a carrier and thus there arises undesirable color which is so called "smudge".

Accordingly, a coating layer containing the acceptor must have a high humidity or water resistance sufficient to maintain stabilities of the color-forming ability and developed color image and to inhibit the "smudge".

On the other hand, a coating composition containing aromatic carboxylic acids and polyvalent metal salts thereof, because of being unstable toward heat in general, needs a careful watch and handling during storage or coating procedure. Paticularly, in the coating procedure the coating composition is subject to mechanical shear and accompanied by a rising temperature. Therefore, when a mechanical and thermal stability is insufficient, the coating composition cannot form a uniform layer on the surface of a base sheet and in the worst case it is unavoidable to discontinue the coating procedure. If the coating procedure is effected by a coating apparatus mounted on a paper machine, it is the most simplified process and therefore advantageous economically. In this case since the coating composition is coated on the base sheet preheated by a dryer, the mechanical and thermal stability requirements become more severe.

SUMMARY OF THE INVENTION

It is, therefore, an object of this invention to provide a sensitized sheet for a pressure sensitive copy system having excellent resistance toward heat, light and particularly a high humidity or water and capable of maintaining a stable color-forming ability.

It is another object of this invention to provide an acceptor coating composition having an excellent mechanical and thermal stability.

It is still another object of this invention to provide a process for the preparation of a sensitized sheet in the most effective way.

The other objects and advantages of this application will appear from the detailed description to follow.

The foregoing and other objects of this invention are attained in a sensitized sheet, for use in a pressure sensitive copy system, having a coating comprising an acceptor, the acceptor being a particulate mixture of (a) an organic acid substance selected from the group consisting of aromatic carboxylic acids and polyvalent metal salts thereof, and (b) an organic high molecular compound.

The mixture of the organic acid substance and organic high molecular compound can be pulverized to uniform fine powders of several microns in particle size by mechanical means, for example ball-milling. A coating layer having the fine powders homogeneously dispersed therein is obtained.

DETAILED DESCRIPTION OF THE INVENTION

The organic acid substance to be used in the invention is selected from the group consisting of aromatic carboxylic acids and polyvalent metal salts thereof. The aromatic carboxylic acids and polyvalent metal salts thereof useful for the acceptor are in detail explained in U.S. Patent Application Ser. No. 265,484, now abandoned, which discloses the pressure sensitive record system. These compounds are illustrated by non-limitative examples as given hereunder, but it should of course be understood that other aromatic carboxylic acids and polyvalent metal salts thereof, capable of color forming when bringing into contact with a color former may be also used.

An aromatic carboxylic acid to be used is represented by the formula I, (I)

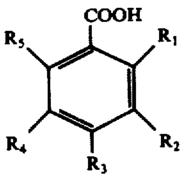

wherein $R_1$, $R_2$, $R_3$, $R_4$ and $R_5$ each represents hydrogen, halogen or a hydroxyl, amino, carboxyl, carbamoyl, N-substituted carbamoyl, alkyl, cycloalkyl, alkoxyl, aryloxy, aralkyl or alkylaryl group, and any adjacent pair of $R_1$ to $R_5$ can, together with the carbon atoms to which they are attached, complete a ring. Compounds of formula I wherein $R_1$ or $R_5$ is a hydroxyl group are especially important in embodiments of the invention as mentioned in detail hereinafter.

Examples of aromatic carboxylic acids of formula I wherein $R_1$ and $R_5$ are not a hydroxyl group include benzoic acid, o-toluic acid, m-toluic acid, p-toluic acid, p-tert.-butylbenzoic acid, o-chlorobenzoic acid, m-chlorobenzoic acid, p-chlorobenzoic acid, dichlorobenzoic acid, trichlorobenzoic acid, tetrachlorobenzoic acid, phthalic acid, isophthalic acid, terephthalic acid, 2-carboxybiphenol, p-oxybenzoic acid, paramethoxybenzoic acid, p-butoxybenzoic acids, p-octoxybenzoic acid, gallic acid, anthranilic acid, phthalic acid monoamide, phthalic acid monoanilide, 3-tert.-butyl-4-hydroxybenzoic acid, 3-cyclohexyl-4-hydroxybenzoic acid, 3-phenyl-4-hydroxybenzoic acid, 3-(α-methylbenzyl)-4-hydroxybenzoic acid, 3,5-dimethyl-4-hydroxybenzoic acid, trimellitic acid, pyromellitic acid, α-naphthoic acid, β-naphthoic acid, tetrachlorophthalic acid and 2,2'-dicarboxydiphenyl.

Aromatic carboxylic acids of formula I wherein $R_1$ or $R_5$ is a hydroxyl group are defined by formula II, (II)

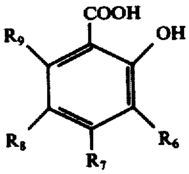

wherein $R_6$ to $R_9$ are as defined in $R_1$ to $R_5$ of formula I.

Examples of such carboxylic acids include salicylic acid, o-cresotinic acid, p-cresotinic acid, 3-ethylsalicylic acid, 4-ethylsalicylic acid, 3-isopropylsalicylic acid, 4-isopropylsalicylic acid, 5-isopropylsalicylic acid, 3-tert.-butylsalicylic acid, 5-tert.-butylsalicylic acid, 3-cyclohexylsalicylic acid, 5-cyclohexylsalicylic acid, 3-phenylsalicylic acid, 5-phenylsalicylic acid, 3-benzylsalicylic acid, 5-tert.-octylsalicylic acid, 3-(α-methylbenzyl) salicylic acid, 5-(α-methylbenzyl) salicylic acid, 5-nonyl salicylic acid, 5-(α,α-dimethylbenzyl) salicylic acid, 5-chlorosalicylic acid, 5-butoxysalicylic acid and 5-octoxysalicylic acid.

Compounds of formula II wherein $R_6$ and $R_8$ are halogen, alkyl, cycloalkyl, aryl, aralkyl or alkylaryl can be easily derived in commercial scales from phenols, alkylphenols, arylphenols or halogenated phenols. Examples of such aromatic carboxylic acids include 3,5-dichlorosalicylic acid, 3-chloro-5-tert.-butylsalicylic acid, 3-chloro-5-tert.-amylsalicylic acid, 3-chloro-5-tert.-octylsalicylic acid, 3-chloro-5-(α,α-dimethylbenzyl) salicylic acid, 3,5-dimethylsalicylic acid, 3-methyl-5-tert.-butylsalicylic acid, 3-methyl-5-cyclohexylsalicylic acid, 3-methyl-5-tert.-octylsalicylic acid, 3-methyl-5-(α-methylbenzyl) salicylic acid, 3-methyl-5-nonylsalicylic acid, 3-methyl-5-(α,α-dimethylbenzyl) salicylic acid, 3,5-diisopropylsalicylic acid, 3,5-di-sec.-butylsalicylic acid, 3-tert.-butyl-5-chlorosalicylic acid, 3-tert.-butyl-5-methylsalicylic acid, 3-tert.-butyl-5-ethylsalicylic acid, 3,5-di-tert.-butylsalicylic acid, 3-tert.-butyl-5-cyclohexylsalicylic acid, 3-tert.-butyl-5-phenylsalicylic acid, 3-tert.-butyl-5-(4'-tert.-butylphenyl)salicylic acid, 3-tert.-amyl-5-chlorosalicylic acid, 3-tert.-amyl-5-methylsalicylic acid, 3-tert.-amyl-5-ethylsalicylic acid, 3,5-di-tert.-amylsalicylic acid, 3-tert.-amyl-5-cyclohexylsalicylic acid, 3-tert.-amyl-5-phenylsalicylic acid, 3-tert.-amyl-5-(4'-tert.-amylphenyl) salicylic acid, 3-cuclohexyl-5-chlorosalicylic acid, 3-cyclohexyl-5-methylsalicylic acid, 3-cyclohexyl-5-ethylsalicylic acid, 3,5-dicyclohexylsalicylic acid, 3-cyclohexyl-5-phenylsalicylic acid, 3-cyclohexyl-5-(4'-cyclohexylpenyl) salicylic acid, 3-phenyl-5-chlorosalicylic acid, 3-phenyl-5-isopropylsalicylic acid, 3-phenyl-5-tert.-butylsalicylic acid, 3-phenyl-5-tert.-amylsalicylic acid, 3-phenyl-5-cyclohexylsalicylic acid, 3-phenyl-5-benzylsalicylic acid, 3-phenyl-5-tert.-octylsalicylic acid, 3-phenyl-5-(α-methylbenzyl) salicylic acid, 3-phenyl-5-nonylsalicylic acid, 3-phenyl-5-(α,α-dimethylbenzyl) salicylic acid, 3-benzyl-5-chlorosalicylic acid, 3-benzyl-5-methylsalicylic acid, 3-benzyl-5-ethylsalicylic acid, 3-benzyl-5-cyclohexylsalicylic acid, 3-benzyl-5-phenylsalicylic acid, 3,5-dibenzylsalicylic acid, 3-benzyl-5-tert.-octylsalicylic acid, 3-benzyl-5-nonylsalicylic acid, 3-benzyl-5-(α,α-dimethylbenzyl) salicylic acid, 3-tert.-octyl-5-chlorosalicylic acid, 3-tert.-octyl-5-methylsalicylic acid, 3-tert.-octyl-5-ethylsalicylic acid, 3-tert.-octyl-5-cyclohexylsalicylic acid, 3-tert.-octyl-5-phenylsalicylic acid, 3,5-di-tert.-octylsalicylic acid, 3-(α-methylbenzyl)-5-chlorosalicylic acid, 3-(α-methylbenzyl)-5-methylsalicylic acid, 3-(α-methylbenzyl)-5-ethylsalicylic acid, 3-(α-methylbenzyl)-5-cyclohexylsalicylic acid, 3-(α-methylbenzyl)-5-phenylsalicylic acid, 3,5-di(α-methylbenzyl) salicylic acid, 3-(α-methylbenzyl)-5-(αλ,α-dimethylbenzyl) salicylic acid, 3-(α-methylbenzyl)-5-{4'-(α-methylbenzyl) phenyl} salicylic acid, 3-nonyl-5-chlorosalicylic acid, 3-nonyl-5-methylsalicylic acid, 3-nonyl-5-ethylsalicylic acid, 3-nonyl-5-phenylsalicylic acid, 3,5-dinonylsalicylic acid, 3-(α,α-dimethylbenzyl)-5-chlorosalicylic acid, 3-(α,α-dimethylbenzyl)-5-methylsalicylic acid, 3-(α,α-dimethylbenzyl)-5-ethylsalicylic acid, 3-(α,α-dimethylbenzyl)-5-t-amylsalicylic acid, 3-(α,α-dimethylbenzyl)-5-cyclohexylsalicylic acid, 3-(α,α-dimethylbenzyl)-5-phenylsalicylic acid, 3-(α,α-dimethylbenzyl)-5-(α-methylbenzyl) salicylic acid, 3,5-di(α,α-dimethylbenzyl) salicylic acid, 3-(4'-tert.-butylphenyl)-5-tert.-butylsalicylic acid, 3-(4'-cyclohexylphenyl)-5-cyclohexylsalicylic acid and 3-{4'-(α,α-dimethylbenzyl) phenyl}-5-(α,αdimethylbenzyl) salicylic acid.

Aromatic carboxylic acids of formula II in which $R_7$ or $R_9$ is alkyl, cycloalkyl or phenyl can be derived from, for example, metacresol, metapropylphenol, metaphenylphenol, 2,3-xylenol, 2,5-xylenol, 3,4-xylenol and 3,5-xylenol. Examples of such carboxylic acids include 3,4-dimethylsalicylic acid, 4,5-dimethylsalicylic acid, 4,6-dimethylsalicylic acid, 4-methyl-5-isopropylsalicylic acid, 4-methyl-5-sec.-butylsalicylic acid, 4-methyl-5-tert.-butylsalicylic acid, 4-methyl-5-tert.-amylsalicylic acid, 4-methyl-5-cyclohexylsalicylic acid, 4-methyl-5-benzylsalicylic acid, 4-methyl-5-tert.-octylsalicylic acid, 4-methyl-5-(α-methylbenzyl) salicylic acid, 4-methyl-5-nonylsalicylic acid, 4-methyl-5-(α,αdimethylbenzyl) salicylic acid, 3,6-dimethylsalicylic acid, 3-tert.-butyl-6-methylsalicylic acid, 3-tert.-amyl-6-methylsalicylic acid, 3-cyclohexyl-6-methylsalicylic acid, 3-tert.-octyl-6-methylsalicylic acid, 3-(α-methylbenzyl)-6-methylsalicylic acid, 3,6-diisopropylsalicylic acid, 3-tert.-butyl-6-isopropylsalicylic acid, 3-tert.-octyl-6-isopropylsalicylic acid, 3-(α,α-dimethylbenzyl)-6-isopropylsalicylic acid, 3-tert.-butyl-6-phenylsalicylic acid, 3-tert.-amyl-6-phenylsalicylic acid, 3-cyclohexyl-6-phenylsalicylic acid, 3-tert.-octyl-6-phenylsalicylic acid, 3-(α-methylbenzyl)-6-phenylsalicylic acid or 3-(α,α-dimethylbenzyl)-6-phenylsalicylic acid.

Aromatic carboxylic acids of formula II in which at least one of $R_6$ to $R_9$ is a hydroxyl group are presented by formula III, (III)

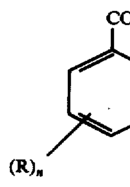

wherein R is an alkyl, cycloalkyl or aralkyl group. Examples of these carboxylic acid include 3-hydroxysalicylic acid, 3-hydroxy-5-tert.-butylsalicylic acid, 3-hydroxy-5-tert.-amylsalicylic acid, 3-hydroxy-5-cyclohexysalicylic acid, 3-hydroxy-5-tert.-octylsalicylic acid, 3-hydroxy-5-(α-methylbenzyl) salicylic acid, 3-hydroxy-5-(α,α-dimethylbenzyl) salicylic acid, 3-hydroxy-4,6-dicyclohexylsalicylic acid, 4-hydroxysalicylic acid, 4-hydroxy-5-tert.-butylsalicylic acid, 4-hydroxy-5-tert.-amylsalicylic acid, 4-hydroxy-5-cyclohexylsalicylic acid, 4-hydroxy-5-tert.-octylsalicylic acid, 4-hydroxy-5-(α-methylbenzyl) salicylic acid, 4-hydroxy-5-(α,α-dimethylbenzyl) salicylic acid, 3,5-diisopropyl-6-hydroxysalicylic acid, 3,5-di-tert.-butyl-6-hydroxysalicylic acid, 3,5-di-tert.-amyl-6-hydroxysalicylic acid, 3,5-di-cyclohexyl-6-hydroxysalicylic acid, 3,5-di-(α-methylbenzyl)-6-hydroxysalicylic acid, 3,5-di-(α,α-dimethylbenzyl)-6-hydroxysalicylic acid, 5-hydroxysalicylic acid, 4-tert.-butyl-5-hydroxysalicylic acid, 4-tert.-amyl-5-hydroxysalicylic acid, 4-cyclohexyl-5-hydroxysalicylic acid, 4-(α-methylbenzyl)-5-hydroxysalicylic acid, 3,6-diisopropyl-5-hydroxysalicylic acid, 3,6-dicyclohexyl-5-hydroxysalicylic acid or 3,6-di(α-methylbenzyl)-5-hydroxysalicylic acid.

As the case that any adjacent pair of $R_6$ to $R_9$ form a ring together with the carbon atoms to which they are attached, there are naphthalene derivatives. They are represented by formulae IV, V and VI, (IV)

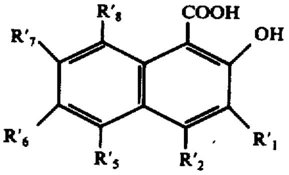

(V)

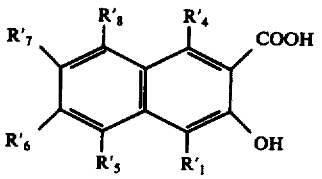

(VI)

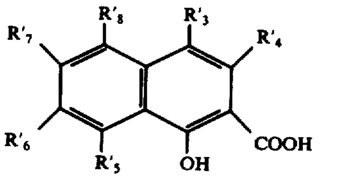

wherein $R'_1$, $R'_2$, $R'_3$, $R'_4$, $R'_5$, $R'_6$, $R'_7$ and $R'_8$ each is hydrogen, halogen or a hydroxyl, alkyl cycloalkyl or aralkyl group. As examples of such naphthalene derivatives, there are indicated 1-hydroxy-2-carboxynaphthalene, 1-hydroxy-2-carboxy-4-isopropylnaphthalene, 1-hydroxy-2-carboxy-4-cyclohexylnaphthalene, 1-hydroxy-2-carboxy-4-benzylnaphthalene, 1-hydroxy-2-carboxy-4-(α-methylbenzyl) naphthalene, 1-hydroxy-2-carboxy-7-isopropylnaphthalene, 1-hydroxy-2-carboxy-7-tert.-butylnaphthalene, 1-hydroxy-2-carboxy-7-tert.-amylnaphthalene, 1-hydroxy-2-carboxy-7-cyclohexylnaphthalene, 1-hydroxy-2-carboxy-7-tert.-octylnaphthalene, 1-hydroxy-2-carboxy-7-(α-methylbenzyl) naphthalene, 1-hydroxy-2-carboxy-7-(α,α-dimethylbenzyl) naphthalene, 1-hydroxy-2-carboxy-4,7-diisopropylnaphthalene, 1-hydroxy-2-carboxy-4,7-di-tert.-butynaphthalene, 1-hydroxy-2-carboxy-4,7-di-tert.-amylnaphthalene, 1-hydroxy-2-carboxy-4,7-dicyclohexylnaphthalene, 1-hydroxy-2-carboxy-4,7-di-benzylnaphthalene, 1-hydroxy2-carboxy-4,7-di-tert.-octylnaphthalene, 1-hydroxy-2-carboxy-4,7-di(α-methylbenzyl) naphthalene, 1-hydroxy-2-carboxy-4,7-di(α,α-dimethylbenzyl) naphthalene, 1-carboxy-2-hydroxy naphthalene, 1-carboxy-2-hydroxy-3,6,8-tri-tert.-butylnaphthalene, 2-hydroxy-3-carboxynaphthalene, 2-hydroxy-3-carboxy-6,8-di-tert.-butylnaphthalene, 2-hydroxy-3-carboxy-6,8-di-tert.-amylnaphthalene, 2-hydroxy-3-carboxy-6,8-dicyclohexylnaphthalene, 2-hydroxy-3-carboxy-6,8-di-tert.-octylnaphthalene, 2-hydroxy-3-carboxy-6,8-di(α-methylbenzyl) naphthalene or 2-hydroxy-3-carboxy-6,8-di(α,α-dimethylbenzyl) naphthalene.

Aromatic carboxylic acids derived from, for example, bisphenol A, 4,4′-dihydroxycyclohexylidenebiphenyl, 4,4′-dihydroxymethylenebiphenyl and 2,2′-dihydroxydiphenyloxide are regarded as condensates of salicylic acid. Examples of these carboxylic acids include 5-(4′-hydroxybenzyl) salicylic acid, 5-(3′-carboxy-4′-hydroxybenzyl) salicylic acid (methylene-bis-salicylic acid), 3-tert.-butyl-5-(3′, 5′-di-tert.-butyl-4-hydroxybenzyl) salicylic acid, 3-(α,α-dimethylbenzyl)-5-{3′,5′-di(α,α-dimethylbenzyl)-4′-hydroxybenzyl}salicylic acid, 3-tert.-butyl-5-(α,α-dimethyl-3′,5′-di-tert.-butyl-4′-hydroxybenzyl) salicylic acid, 5-(α,α-dimethyl-3′-carboxy-4′-hydroxybenzyl) salicylic acid, 5-(α,α-dimethyl-4′-hydroxybenzyl) salicylic acid, 3-(2′-hydroxyphenoxy) salicylic acid, 3-(2′-hydroxy-3′-carboxyphenoxy) salicylic acid, 3-(2′-hydroxy-3′-carboxy-5′-tert.-butylphenoxy)-5-tert.-butylsalicylic acid, 3-(2′-hydroxy-3′,5′-di-tert.-butylphenoxy)-5-tert.-butylsalicylic acid, 3-{2′-hydroxy-3′-carboxy-5′-(α,α-dimethylbenzyl) phenoxy}-5-(α,α-dimethylbenzyl) salicylic acid, 3-{2′-hydroxy-3′,5′-di(α,α-dimethylbenzyl) phenoxy}-5-(α,α-dimethylbenzyl) salicylic acid or 3-(2′-hydroxy-3′,5′-dicyclohexylphenoxy)-5-cyclohexylsalicylic acid.

Furthermore, a large number of aromatic carboxylic acids of formula II which are difficult to be expressed in the chemical nomenclature are listed. For instance, there are indicated coplymerization products of formaldehyde with salicylic acid or nucleus-substituted salicylic acids and phenols, salicylic acid or nucleus-substituted salicylic acid adducts of propylene polymer or isobutylene polymer, salicylic acid or nucleus-substituted salicylic acid adducts of benzylchloride polycondensation products, salicylic acid or nucleus-substituted salicylic acid adducts of styrene polymers, salicylic acid or nucleus-substituted salicylic acid adducts of α-methylstyrene polymers, salicylic acid or nucleus-substituted salicylic acid condensates of aldehydes or acetylene, salicylic acid or nucleus-salicylic acid condensate of ketones, and salicylic acid or nucleus-substituted salicylic acid adducts of compounds having an unsaturated bond.

The terms of "aromatic carboxylic acids" and "polyvalent metal salts thereof" used herein and in the claims include also the condensates and polymerizates as mentioned above and polyvalent metal salts thereof.

All of the above aromatic carboxylic acids can form salts with polyvalent metals.

Polyvalent metals which are concerned with the acceptors of the present invention represent all the salt-forming metals other than lithium, sodium, potassium, rubidium, cesium and francium. The useful polyvalent metals include magnesium, aluminum, calcium, scandium, titanium, vanadium, chromium, manganese, iron, cobalt, nickel, cooper, zinc, gallium germanium, strontium, yttrium, zirconium, niobium, molybdenum, silver, cadmium, indium, tin, antimony, barium, tungsten, mercury, lead and bismuth. Further, most suitable metals for the practical use of them are magnesium, aluminum, calcium, titanium, manganese, zinc and tin.

Among the above-mentioned aromatic carboxylic acids and polyvalent metal salts thereof, compounds having at least one hydroxyl group on the benzene ring, particularly a hydroxyl group at the ortho-position to the carboxyl group are preferred from the point of view of color-forming ability. From aspects of the heat and moisture resistances and the compatability with an organic high molecular compound, an aromatic carboxylic acid and polyvalent metal salt thereof, having higher molecular weight are preferred, that is, ones having 10 or more, preferably 17 or more carbon atoms in total are recommended. particularly, compounds of formulae II, III, IV, V and VI in which 3 position to the carboxyl group is substituted with isopropyl, secondary butyl, tert.-butyl, tere.-amyl, cyclohexyl, phenyl, substituted phenyl, benzyl, α-methylbenzyl, α,α-dimethylbenzyl, tert.-octyl, nonyl and the other group having 3 or more carbon atoms show excellent color-forming properties, stability toward water and compatability with an organic high molecular compound. Compounds of formulae II, V, VI and VII bearing at least one of b 5-membered and 6-membered carbon-rings as substituents and having 17 or more carbon atoms in total are most preferred.

The polyvalent metal salts of aromatic carboxylic acid are obtained by reaction of aromatic carboxylic acids with oxides, hydroxides, carbonates and silicates of polyvalent metals, though they are conveniently obtained by a double decomposition of an alkali metal salt of aromatic carboxylic acid and a water soluble polyvalent metal salt. In this case the aromatic carboxylic acid and water soluble polyvalent metal salt each may be used alone or in mixture of two or more. The polyvalent metal salts of aromatic carboxylic acid are usually obtained in form of crystalline powders, amorphous fine powders of viscous liquids.

An organic high molecular compound used in the invention should show an easily non-fluidifying property at normal temperature and preferably is selected from ones having a molecular weight of about 400 or more. The following are examples of useful organic high molecular compounds: Polybutadiene, butadiene copolymers such as butadiene-isoprene copolymer and butadiene-styrene copolymer, cyclopentadiene polymers, cyclopentadiene copolymers, polystyrenes, styrene copolymers, α-methylstyrene polymers, α-methylstyrene copolymers, polyvinyl chloride, vinylchloride copolymers, vinylidenechloride copolymers, polychloroprene (Neoprene), acrylic ester polymers, acrylic ester copolymers, acrylic acid copolymers, methyacrylic ester polymers, methacrylic ester copolymers, methyacrylic acid copolymers, vinylacetate polymers, vinylacetate copolymers such as a ethylene-vinylacetate copolymer, acrylonitrile copolymers, acrylamide copolymers, allylalcohol copolymers, benzylchloride polycondensation products, benzylchloride copolycondensation products, meta-xylene-formaldehyde condensates, diphenyl-formaldehyde condensates, diphenyl-meta-xylene-formaldehyde copolycondensation products, phenol-formaldehyde condensates, substituted phenol-formaldehyde condensates, phenol-meta-xylene-formaldehyde condensates, the other phenol copolycondensation products, the other substituted-phenol copolymers, polyester resins, melamine resins, polycarbonate resins, butyral resins, nitrocellulose, ethylcellulose, shellac, gilsonite, dammar. Styrene polymers, styrene copolymers, α-methylstyrene polymers, α-methylstyrene copolymers and substituted phenol-formaldehyde polymerization condensation products are preferred. These high molecular compounds have good compatability with various types of the organic acid substance and therefore are easily pulverized to fine powders, and maintain a good color-forming property.

It is desirable for the above organic high molecular compound to be selected from compounds having compatibility with the organic acid substance to be incorporated therein. The term of "compatability" used herein means such property that two or more chemical substances dissolve with one another and also such case that the dissolution occurs only in the one because of the other being crystalline.

In many cases, the compatability of a chemical substance may be explained in relation with polarity of the substance. A suitable combination of the organic acid substance and high molecular compound in the present invention will be determined taking this point of view into consideration. Generally speaking, the polarity of chemical substance is qualitatively understood in the light of the balance between an inorganophile and an organophile. An aromatic carboxylic acid is usually increased in the organophile and lowered in the polarity as the number of carbon atoms becomes large. In case of aromatic carboxylic acids having the same number of carbon atoms, as polar radicals such as hydroxyl, carboxyl, nitro, cyano, and halogen are introduced into the molecule, the polarity becomes higher. The polarity may also vary depending the type of radicals and the position of radicals in the molecular. Types of polyvalent metals have influence on the compatability which may be explained in relation with the polarity. For example, many of polyvalent metals which tend to form polyvalent metal salts having a high inorganophile or high polarity are metals with a relatively small atomic weight such as magnesium, aluminum, calcium and titanium. To the contrary, zinc and tin tend to form polyvalent metal salts with low inorganophile or low polarity. On the other hand, in case of organic high molecular compounds, when, for example, polyethylene and polypropylene which are regarded as being of the lowest polarity are introduced with double bond or substituted with halogen, benzene ring or hydroxyl, carboxyl, ether, ester, ketone, nitro, cyano and amide radicals, the polarity increases depending upon the type and number of the substituents.

As substances having the similar polarity are compatible or miscible with each other, a pulverized homogeneous mixture comprising an organic acid substance and organic high molecular compound is obtained by selecting the organic high molecular compound having the similar polarity to that of an aromatic carboxylic acid and polyvalent metal salt.

An organic high molecular compound compatible with an organic acid substance of a relatively high polarity is selected from one with a high polarity which bears polar radicals in the molecule. However, if such radicals as -C≡N, -CO-, -N=, $-SO_2-$, -SO-, -S-, -PO≡, -P=, -CS- and -O- are present in large numbers in the molecule, they obstrust color forming reaction with a color former and therefore it is desirable to confine the introduction of such radicals to the irreducible minimum of a demand. Halogen and a phenyl radical show no obstacle to the color reaction. Particularly, hydroxyl and carboxyl radicals have no obstacle to the color reaction and raise the polarity in the presence of a small number of radicals.

Though an incorporation ratio of the organic high molecular compound to the organic acid substance is not particularly limited, when the amount of the former is too little, the desired resistance toward heat, light and particularly a high moisture or water cannot be attained. It is desirable to incorporate the organic high molecular compound in the amount of 5 parts by dry weight or more, preferably 15 ~ 300 parts by weight based 100 parts by dry weight of the organic acid substance.

There are many methods for obtaining a pulverized mixture comprising the organic acid substance and organic high molecular compound. For example, the most simple and preferable method includes the steps of mixing and melting the organic high molecular compound and organic acid substance while heating, solidfying the resultant by cooling and then pulverizing it. Another method includes the steps of dissolved the organic acid substance and high molecular compound in an organic solvent therefor and mixing same, evaporating the resultant to dryness and then pulverizing it. The pulverizing may be effected in dry system or in wet system with a medium such as water. In this case surface active agents and fine powders with high hardness such as silicic anhydride and kaolin may be allowed to co-exist in order to raise pulverization efficiency.

As the organic high molecular compound used in the above methods one having a relatively high glass transistion point (second order transistion point) and a relatively low molecular weight is preferred. It is in general said that an organic high molecular compound having a large number of ring-structures in the molecule shown high second order transistion point. There are, for example, indicated polystyrene, styrene-α-methylstyrene copolymers, α-methylstyrene polymers, cyclopentadiene copolymers, aliphatic unsaturated cyclic hydrocarbon polymers, benzylchloride-diphenyl poly-condensation products, meta-xylene-formaldehyde poly-condensation product, meta-xylene-diphenyl-formaldehyde copoly-condensation products, meta-xylene-alkyl-phenol-formaldehyde copoly-condensation products, meta-xylene-diphenyl oxide-formaldehyde copoly-condensation products, diphenylalkylphenol copoly-condensation products, substituted phenol-formaldehyde poly-condensation products, substituted phenol-diphenyl oxide-formaldehyde copoly-condensation products, methacrylic ester polymers, acrylonitrilestyrene copolymers, nitrocellulose, ethylcellulose. polyester resins and polycarbonate resins, having a molecular weight of about 600 to 5,000.

Alternatively, a particulate mixture in waterdispersed form is obtained by liquidizing the organic acid substance and high molecular compound by heating or addition of an organic solvent, dispersing in water the resultant, and cooling same or if necessary, removing the organic solvent.

Further alternative method includes the steps of mixing the organic acid substance and an initiator and regulator for polymerization with a vinyl monomer capable of dissolving the organic acid substance, such as styrene, α-methylstyrene, ethylacrylate and methylmethacrylate, and effecting a suspension or emulsion polymerization in water thereby to obtain a particulate mixture consisting of the organic acid substance and organic high molecular compound.

Furthermore alternative method for obtaining the particulate mixture includes the steps of adding an alkali metal or ammonium salt or aromatic carboxylic acids into an emulsion or organic high molecular compounds, for example polystyrene emulsion and styrene-butadiene copolymer emulsion, further adding an acid or an aqueous solution of polyvalent metal salts thereto and effecting and acid decomposition or double decomposition. In this case heating may be effected in order to promote the diffusion of the aromatic carboxylic acid or polyvalent metal salt thereof into the particles of the emulsified organic high molecular compound. A finely pulverized mixture is thus obtained in form of an emulsion or dispersion in water.

In many cases, according to the invention, the organic acid substance and organic high molecular compound completely dissolve with each other and form a homogeneous phase, but even though non-dissolving portions are in part present in the homogeneous phase, it does not at all obstruct the objects of the invention. The fine powders obtained are controlled to a particle size of normally less than several microns, preferably about 0.5 μ.

In some of the methods for preparation of the particulate mixture comprising the organic acid substance and organic high molecular compound, the particulate mixture may be further incorporated with at least one of a water-insoluble inorganic material, in form of particles, such as oxides, hydroxides and carbonates of a metal, and other mineral pigment, and an organic material in form of powder such as powdered starch, powdered celluloses and organic pigments. For example, in incorporating the orgaic acid substance with the organic high molecular compound under heating, a water-insoluble inorganic material in form of particles such as clay, kaolin, activated clay, zinc oxide, calcium carbonate and aluminum hydroxide is further incorporated therewith, solidified by cooling and pulverized. Thus, a particulate substrate in which the mixture of the organic acid substance and organic high molecular compound is adsorbed around the inorganic powders is obtained. The additional incorporation of the inorganic or organic powders brings about extending effect for the particulate substrate and improvement in fluidity of a coating composition. Particularly, the incorporation of the inorganic powders, as mentioned hereinafter, improves a color-forming property of the organic acid substance as well as resistance of a sensitized sheet toward the sun light. An incorporation amount of the inorganic or organic powders is not particularly limited so far as the nature of the organic acid substance does not recede. It is usually preferred to incorporate the inorganic and/or organic powders in an amount of less than 2000 parts by dry weight based on 100 parts by dry weight of the organic acid substance.

For the purposes of improving the compatability between the organic acid substance and organic high molecular compound and also the color-forming property, it is preferred to further incorporate an aliphatic carboxylic acid and/or polyvalent metal salt thereof into the particulate substrate.

Examples of the aliphatic carboxylic acid include a saturated monocarboxylic acid represented by the formula, $C_nH_{2n+1}COOH$ wherein n is an integer, for example valeric acid, caproic acid, caprylic acid, capric acid, lauric acid, myristic acid, palmitic acid, stearic acid or a petrochemically derived synthetic fatty acid, an unsaturated or cyclic mono-carboxylic acid represented by the formula, $C_nH_{2n-m}COOH$ wherein n is an integer and m is an integer of 1, 3, 5, 7 or 9, for example, acrylic acid, crotonic acid, oleic acid, elaindic acid, erucic acid, linolic acid, linolenic acid, eleostearic acid, phenylacetic acid or naphthylacetic acid, monooxyfatty acid such as lactic acid, ricinolic acid or oxystearic acid, a halogenated fatty acid such as α-dichloropalmitic acid and α,α-dichlorostearic acid, a poly-fattyacid such as oxalic acid, malonic acid, succinic acid, glutaric acid, adipic acid, suberic acid, azelaic acid, sebacic acid, maleic acid, furmaric acid, itaconic acid, citraconic acid, mesaconic acid, glutaconic acid, malic acid and citric acid, and halogenated products thereof, phenoxyacetic acid, a nucleus substituted phenoxyacetic acid, maleic acid copolymers, an unsaturated fatty acid polymer or an unsaturated carboxylic acid copolymer, and rosin.

A metal salt of the above aliphatic carboxylic acids may be also used for the same purpose as mentioned above. These compounds include salts of all the metals which can form the salts with the above fattyacids. The aliphatic carboxylic acids and metal salts thereof may be preferably used in an amount of less than about 100 parts by dry weight in respect of 100 parts by dry weight of the organic acid substance and organic high molecular compound in total.

A coating composition according to the invention is obtained by dispersing the particulate mixture comprising the organic acid substance and organic high molecular compound, if necessary, with a suitable binder into water or a suitable organic solvent which does not easily dissolve the organic acid substance and high molecular compound. Such an organic solvent is exemplified by methanol, ethanol, isopropanol, ethylene glycol and propylene glycol, and may be used in mixture with water. Examples of the binder include starch, casein, gelatine, gum arabic, polyvinyl alcohol, polyacrylamide, acrylamidemethylol acrylamide copolymer, acrylamide-acrylonitrile copolymer, methylolacrylamide-acrylic ester copolymer, acrylamide-acrylic ester copolymer, acrylic acid-acrylic ester copolymer, methyl cellulose, melamine resins, urea resins, sodium polyacrylate, carboxymethyl cellulose, carboxyethyl cellulose, natural rubber, synthetic rubber, polyacrylic acid ester, polymethyacrylic acid ester, polyvinyl acetate, vinyl acetate-ethylene copolymer, polypropylene, polystyrene, polyisobutylene, vinyl chloride-vinyl acetate copolymer, methyl cellulose, ethyl cellulose, nitrocellulose, cellulose acetate, phenol resins, butyral resins, petroleum resins and alkyd resins.

The binders particularly water-soluble binders can be added with chemical linking agents for forming water-insoluble binders by the reaction.

If an aqueous coating composition is desired, a water insoluble binder is used in the condition of suspension or emulsion in water.

A carboxyl-modified polymer emulsion is particularly preferred because it is quite stable in coatings and show sufficient adhesive property in a small quantity. Examples of such an emulsion are carboxylated styrene-butadiene copolymer emulsion, carboxylated methylmethacrylate-butadiene emulsion and vinyl acetate-crotonic acid copolymer emulsion. In many cases the binders are used in mixture of two or more, and a suitable combination of water-soluble and water-insoluble binders is usually used.

The coating composition of the invention may contain water-insoluble oxides, hydroxide and carbonates of a metal and/or other mineral pigments. Particularly such metal compounds as oxides, hydroxides and carbonates of a polyvalent metal exhibit and excellent color-forming property in co-existence with the aromatic carboxylic acids. Therefore, these metal compounds are quite effective to be used in combination with some of aromatic carboxylic acids which are considered as disadvantageous in practice because of an inactive color reaction and low color density. Suitable metal compounds are oxides, hydroxides, and carbonates of such a metal as magnesium, calcium, barium, zinc, titanium, aluminum, nickel, cobalt, manganese, iron, tin, chromium, and palladium, and for example, magnesium oxide, calcium oxide, barium oxide, zinc oxide, aluminum oxide, tin oxide, magnesium hydroxide, calcium hydroxide, zinc hydroxide, aluminum hydroxide, tin hydroxide, magnesium carbonate, calcium carbonate and zinc carbonate are particularly preferred.

The above inorganic metal compounds which generally belong to the class referred to as "mineral pigments" have little color-forming ability by themselves, but exhibit nevertheless the especial color-forming ability in combination with the aromatic carboxylic acids. The above specified metal compounds are, therefore, referred to especially as "inorganic metal compounds" herein and distinguished from the conventional mineral pigments. The mineral pigments other than the inorganic metal compounds to be used are exemplified by activated clay, acid clay, aluminum silicate, zinc silicate, tin silicate, a colloidal aluminum hydrosilicate zeolite, bentonite, kaoline and talc. They are referred to merely as "mineral pigment".

The coating composition may include the above defined inorganic metal compound and mineral pigment in an amount of 1 to 10,000, preferably 5 to 1,000 parts by dry weight in respect of 100 parts by dry weight of the aromatic carboxylic acid and/or polyvalent metal salt thereof. It should be understood that the coating composition may contain all or a part of the inorganic metal compound and mineral pigment incorporated in the particulate substrate comprising the organic acid substance and organic high molecular compound as mentioned hereinbefore.

The desired coating compositions for some types of self-contained copying papers contain further fine capsules enveloping the color former therein.

The coating composition is applied on the surface of a support by the conventional coating means, for example an air knife, rolls, blades and a sizing press or printed on the support by the printing press, for example a letter press and flexographic method. If a coating composition is of an organic solvent type, the printing method is preferred and the coating composition may contain further a plasticizer such as tributyl phosphate, dibutyl phthalate, dioctyl phthalate, butyl adipate and castor oil.

A paper of natural fibers, a paper of synthetic fibers and a film of synthetic polymers may be used as the support, though the paper of natural fibers are usually used. The support, if necessary, may be one having a barrier-coat of a natural or synthetic high molecular substance.

The sensitized sheet according to the invention has advantages as described hereunder. The organic acid substance, because of being prevented from the actions of heat, light and particularly high moisture or water by the organic high molecular compound, can maintain a stable color-forming ability for a long time and completely prevent the "smudge". Accordingly, an organic acid substance with a relatively low molecular weight such as salicylic acid or its polyvalent metal salt which was unsuitable for practical use can be now put to practical use.

The coating composition, because of being excellent in a mechanical and thermal stability, can be preserved in a state of perfection and also the coating work can be easily effected. Further, it is possible to apply it on the support by a coating apparatus mounted on the paper machine so that the pressure sensitive recording sheets are obtained in extremely economical way.

The particulate mixture comprising the organic acid substance and organic high molecular compound can be pulverized to fine powders with an uniform particle size of several microns by the mechanical means, for example ball milling. It is, therefore, possible to form a coating layer in which the fine powders are homogeneously dispersed so that clear images free of bleeding are obtained.

The coating composition is usually applied in an amount of more than about $2g/m^2$ and the upper limit is confined by a mere economical reason.

The invention is illustrated by non-limitative Examples to follow. Amounts of formulation are given in parts by dry weight unless otherwise indicated.

EXAMPLE 1

100 parts of a thermoplastic modified xylene resin with a softening point of 110° C (sold in Nikanol S-100 by Mitsubishi Gas Chemistry Co., Japan) were heated to 180° C, added with 90 parts of zinc 3,5-di($\alpha$,$\alpha$-dimethylbenzyl) salicylate while stirring, and dissolved. A mass was obtained by cooling and solidifying the mixture. The mass was coarsely crushed and then pulverized with 200 parts of kaolin and 30 parts of a powdered silicic anhydride (sold in Carplex No. 80 by Shionogi Pharmaceutical Co., Japan) in a ball mill for 15 hours. A particulate mixture with an average particle size of about 3 $\mu$ were, thus, obtained. The total contents of the ball mill were added with 40 parts of a soluble starch and 100 parts of styrene-butadiene copolymerization latex (solids, 50%) to 600 parts of water and stirred thoroughly. A coating composition was, thus, obtained. A sensitized sheet was obtained by applying the coating composition on the surface of a continuously running paper web of $50g/m^2$ in an amount of $10g/m^2$ by dry weight, using a pilot paper machine(sold as RISSAR PAPER MACHINE by Mitsubishi Kakoki Co. Japan) provided with the similar coater to a commercial coater in large scale.

The coating composition was applied on the surface of a preheated paper web and recycled during the coating work. As the result the coating composition was subjct to mechanical shearing and concurrently reached the temperature of 70° C at the highest, but maintained a markedly stable fluidly without increase of viscosity.

EXAMPLE 2-1 ~ 2-14

100 parts of α-methylstyrene-styrene copolymer with a molecular weight of about 1500 obtained by polymerization of 60 wt.% of α-methylstyrene and 40 wt.% of styrene in the presence of thioglycolic acid were incorporated into and melted with 200 parts of each of organic acid substance as given hereunder at temperatures of 150° to 190° C to form a homogeneous liquid phase. An easily crushible mass was obtained by cooling the liquid phase.

| Example No. | Organic acid substances |
|---|---|
| 2-1 | 3,5-di-(α-methylbenzyl) salicylic acid |
| 2-2 | Zinc 3-phenyl-5-(α,α-dimethylbenzyl) salicylate |
| 2-3 | Aluminum 3-phenyl-5-(α,α-dimethylbenzyl) salicylate |
| 2-4 | Zinc 3-cyclohexyl-5-(α,α-dimethylbenzyl) salicylate |
| 2-5 | Zinc salt of 3-cyclohexyl-5-(α,α-dimethylbenzyl) salicylic acid 70 weight % and its aluminum salt 30 weight % |
| 2-6 | Zinc 3,5-di-(α,α-dimethylbenzyl) salicylate |
| 2-7 | Zinc salt of 3,5-di-(α,α-dimethylbenzyl) salicylic acid 70 weight % and its aluminum salt 30 weight % |
| 2-8 | Zinc 3-(α-methylbenzyl)-5-(α,α-dimethylbenzyl) salicylate |
| 2-9 | Zinc salt of 3-(α-methylbenzyl)-5-(α,α-dimethylbenzyl) salicylic acid 70 weight % and its aluminum salt 30 weight % |
| 2-10 | Zinc 3,5-di-(α,α-dimethylbenzyl) salicylate |
| 2-11 | Zinc 3-(α,α-dimethylbenzyl)-5-phenyl salicylate |
| 2-12 | Aluminum 3-(α,α-dimethylbenzyl)-5-phenyl salicylate |
| 2-13 | Zinc salt of 3-(α,α-dimethylbenzyl)-5-phenyl salicylic acid 70 weight % and its aluminum salt 30 weight % |
| 2-14 | Zinc 3,5-dicyclohexyl salicylate |

200 parts of each of the mass thus obtained were crushed to an average particle size of about 200 μ, incorporated with one part of a formaldehyde-sodium naphthalenesulfonate condensate (sold as Demol-N by Kao Atlas Co. Japan), 600 parts of water and 20 parts of a soluble starch, and then passed through a sand grind mill. Finally, 40 parts of a styrene-butadiene copolymerization latex (solids, 50%) were added thereto to obtain various coating compositions.

Sensitized sheets were obtained by applying each of the coating compositions on a support in an amount of 7g/$m^2$ by dry weight in the same manner as in Example 1. All of the coating compositions exhibited an excellent mechanical and thermal stability during the coating work.

EXAMPLE 3-1 ~ 3-14

200 parts of each of the mass obtained in Example 2 were crushed to an average particle size of about 200 μ, incorporated with 200 parts of kaolin, 50 parts of zinc oxide, 600 parts of water, 40 parts of a soluble starch and one part of Demol-N (see Example 2), and then pulverized in a sand grind mill. Finally, 100 parts of a carboxylated styrene-butadiene copolymerization latex (solids, 50%) were added thereto the obtained various coating compositions.

Sensitized sheets were obtained by applying each of the coating compositions on a support in an amount of 10g/$m^2$ by dry weight in the same manner as in Example 1. All of the coating composition exhibited the same mechanical and thermal stability as in Example 1.

EXAMPLE 4

A coating composition was obtained in the same procedure as in Example 1 except that 5 parts of zinc stearate were further added in the incorporation of 100 parts of Nikanol S-100 and 90 parts of zinc 3,5-di(α,α-dimethylbenzyl) salicylate.

A sensitized sheet was obtained from the coating composition in the same manner as in Example 1.

EXAMPLE 5

100 parts of α-methylstyrene polymer with a molecular weight of about 1100 were heated at about 180° C together with 10 parts of zinc stearate and 60 parts of zinc 3-{4'-(α,α-dimethylbenzyl)phenyl}-5-(α,α-dimethylbenzyl) salicylate, melted and incorporated in. The resultant was cooled, solidified and coarsely crushed. All of the crushed products were incorporated with 40 parts of a powdered zinc silicate, 20 parts of polyacrylamide (degree of polymerization, about 1,000) and 500 parts of water and pulverized in a porcelain ball mill for about 20 hours. Finally, 60 parts of a styrene-butadiene polymerization latex were added thereto to form a coating composition.

A sensitized sheet was obtained from the coating composition in the same procedure as in Example 1. The coating composition exhibited a good mechanical and thermal stability during the coating work.

EXAMPLE 6-1 ~ 6-14

100 parts of a novolak type p-phenylphenolformaldehyde polycondensation product (molecular weight, about 800) were incorporated into and melted with 150 parts of each of the organic acid substance as indicated hereunder at temperatures of 100° ~ 200° C. A mass was obtained by cooling and solidifying the resulting liquid.

| Example No. | Organic acid substances |
|---|---|
| 6-1 | Salicylic acid |
| 6-2 | Zinc salicylate |
| 6-3 | 3-hydroxy-5-(α,α-dimethylbenzyl) salicylic acid |
| 6-4 | Zinc 3-hydroxy-5-(α,α-dimethylbenzyl) salicylate |
| 6-5 | Zinc 3-phenyl-5-(α,α-dimethylbenzyl) salicylate |
| 6-6 | Zinc 3,5-di(α-methylbenzyl) salicylate |
| 6-7 | Zinc 3,5-di-tertiary-butyl salicylate |
| 6-8 | Zinc 4-octoxylbenzoate |
| 6-9 | Zinc 3-phenyl salicylate |
| 6-10 | 4-tertiary-butylbenzoic acid |
| 6-11 | Zinc 5-(3'-carboxy-4'-hydroxybenzyl) salicylate |
| 6-12 | 5-(3'-carboxy-4'-hydroxybenzyl) salicylic acid |
| 6-13 | Magnesium 3,5-di-tertiary-butyl-salicylate |
| 6-14 | 1-carboxy-2,3-dihydroxy-6-(α,α-dimethylbenzyl) naphthalene 50 weight % and 1-carboxy-2,3-dihydroxy-7-(α,α-dimethylbenzyl) napththalene 50 weight % |

Each of the mass was crushed to powders with a particle size of about 200 μ. 200 parts of each of the powdered substances were incorporated with 50 parts of zinc oxide, 600 parts of water and 40 parts of a soluble starch and pulverized in a sand grind mill. Finally, 100 parts of a carboxylated styrene-butadiene copolymer latex (solids, 50%) were added to form a coating composition. A sensitized sheet was obtained by applying the coating composition on a support in the same manner as in Example 1. Each of the coating compositions exhibited the same mechanical and thermal stability as that of Example 1.

EXAMPLE 7

100 parts of polystyrene with a molecular weight of about 1000, 50 parts of aluminum 3-(α,α-dimethylbenzyl)-5-cyclohexylsalicylate and 300 parts of kaolin were heated at 180° C, melted and incorporated in. A mass was obtained by cooling and solidifying the resultant. The mass was coarsely crushed, then incorporated with 520 parts of an aqueous solution containing 20 parts of polyvinyl alcohol and pulverized in a ball mill for 20 hours. Finally, 20 parts of a styrene-butadiene copolymer latex (solids, 50%) were added to form a coating composition.

A sensitized sheet was obtained from the coating composition in the same procedure as in Example 1. The coating composition exhibited the same mechanical and thermal stability as that of Example 1.

EXAMPLE 8

100 parts of α-methylstyrene polymer with a molecular weight of about 1000, 50 parts of 3-cyclohexyl-5-(αλ ,α-dimethylbenzyl) salicylic acid, 3 parts of stearic acid and 30 parts of zinc oxide were heated at 170° C, melted and incorporated in. The resultant was cooled and solidified to form a mass. The mass obtained was coursely crushed, added with 500 parts of an aqueous solution containing 20 parts of starch and then pulverized in a ball mill for 10 hours. Finally, 50 parts of a styrenebutadiene copolymer latex (solids, 50%) were added to form a coating composition.

A sensitized sheet was obtained from the coating composition in the same procedure as in Example 1. The coating composition exhibited the same mechanical and thermal stability as that of Example 1.

EXAMPLE 9

100 parts of polystyrene with a molecular weight of about 2000 obtained by a polymerization in carbon tetrachloride and 100 parts of aluminum 3,5-di(α-methylbenzyl) salicylate were incorporated and melted at about 150° C, then cooled and solidified. The mass obtained was crushed to granules with a particle size of less than about 1000 μ, added with 400 parts of kaolin and 100 parts of zinc oxide, and pulverized in a ball mill for 10 hours. All of the milled products were dispersed in a solution consisting of 200 parts of water, 800 parts of ethanol and 100 parts of ethylcellulose to form an ink composition.

A sensitized sheet was obtained by printing the ink composition on a support with a weight of 50 $g/m^2$ in an amount of 7 $g/m^2$ by dry weight using the usual printing machine.

EXAMPLE 10

100 parts of a styrene allylalcohol copolymer (monomer weight ratio 90 : 10, molecular weight about 3,000) and 200 parts of zinc 3,5-di-(α-methylbenzyl) salicylate were dissolved in 200 parts of acetone. The acetone was, then, evaporated to obtain a mass. The mass was coarsely crushed to a particle size of about 200 μ, and 200 parts of the crushed products were incorporated with 1 part of Demol-N (see Example 2), 600 parts of water and 20 parts of a soluble starch and pulverized in a grinder (sold as Attritor by Mitsui Miike Seisakusho, Japan). Finally, 40 parts of styrene-butadiene copolymer latex (solids, 50%) were added to form a coating composition.

A sensitized sheet was obtained with use of the coating composition in the same manner as in Example 1.

EXAMPLE 11

100 parts of a styrene-allylalcohol copolymer (monomer weight ratio 85 : 15, molecular weight about 1500) and 300 parts of zinc 3,5-di-(α-methylbenzyl) salicylate were dissolved in 300 parts of acetone. The solution obtained thus was little by little added to a dispersion consisting of 2500 parts of water, 30 parts of Demol-N and 500 parts of kaolin while stirring whereby a dispersion of a particulate substrate consisting of the styrene-allylalcohol copolymer and zinc 3,5-di-(α-methylbenzyl) salicylate was obtained. A sensitized sheet was obtained by applying the dispersion on a support of 50 $g/m^2$ in weight in an amount of 7 $g/m^2$ by dry weight.

EXAMPLE 12

To 200 parts of a polystyrene emulsion (solids, 50%) were added 100 parts of a 30% aqueous solution of sodium 3-(α,α-dimethylbenzyl)-5-methyl salicylate, heated to a temperature of 80° C and added little by little with 500 parts of a 40% aqueous solution of stannous chloride while stirring. Thereafter, stirring was further effected for about one hour while maintaining a temperature the solution at 90° C. The emulsified polystyrene particles obtained herein contain tin 3-(α,α-dimethylbenzyl)-5-salicylate. Next, 150 parts of kaolin, 100 parts of water and 30 parts of a soluble starch were added to the above emulsion while vigorously stirring whereby a coating composition was obtained.

A sensitized sheet was obtained with the use of the coating composition in the same procedure as in Example 1.

EXAMPLE 13-1 ~ 13-9

100 parts of zinc 3,5-di(α-methylbenzyl) salicylate were incorporated in and melted with 50 parts of each of the organic high molecular compounds as indicated hereunder. The resultant was cooled and solidified, thus a mass being obtained.

| Example No. | Organic high molecular compounds |
|---|---|
| 13-1 | Styrene-α-methylstyrene copolymer (monomer weight ratio 60 : 40, molecular weight 5,000) |
| 13-2 | Polystyrene (molecular weight 1,500) |
| 13-3 | Styrene-acrylonitrile copolymer (monomer weight ratio 80 :20, molecular weight 2,000) |
| 13-4 | Vinylchloride-vinylacetate copolymer (monomer weight ratio 85 : 15, molecular weight 5,000) |
| 13-5 | Styrene-methylmethacrylate copolymer (monomer weight ratio 80 : 20, molecular weight 2,000) |
| 13-6 | Diphenyl-formaldehyde polycondensation product (molecular weight 600) |
| 13-7 | Shellac |
| 13-8 | Polystyrene (molecular weight 1,500) 70 weight % and paraoctylphenol-formaldehyde polycondensation product (molecular weight 800) 30 weight % |
| 13-9 | Paraphenylphenol-formaldehyde polycondensation product (molecular weight 700) 60 weight % and isophthalic acid-ethylene glycol polycondensation product (molecular weight 1,800) 40 weight % |

Each of the above mass was coarsely crushed. 150 parts of each of the crushed products were incorporated with 75 parts of kaolin, 35 parts of activated clay, 450 parts of water and 30 parts of a soluble starch and pulverized in a sand grind mill. Finally, 75 parts of a styrene-butadiene copolymer latex (solids, 50%) were added to form a coating composition. A sensitized sheet was obtained from the coating composition in the same procedure as in Example 1. The coating composition exhibited a good mechanical and thermal stability like Example 1.

For comparison with the above Examples an aqueous dispersion of organic acid substance containing the composition as indicated hereunder was prepared separately.

| Control 1 Composition | Parts by weight |
|---|---|
| Salicylic acid | 100 |
| Demol-N (see Example 2) | 1 |
| Polyvinyl alcohol | 5 |

| Control 2: Composition | Parts by weight |
|---|---|
| Salicylic acid | 100 |
| Zinc oxide | 300 |
| Demol-N | 4 |
| Polyvinyl alcohol | 20 |

| Control 3: Composition | Parts by weight |
|---|---|
| Zinc 3-phenylsalicylate | 100 |
| Demol-N | 1 |
| Styrene-butadiene copolymer Latex (solids 50%) | 16 |

| Control 4: Composition | Parts by weight |
|---|---|
| Zinc 3,5-di-tertiary-butyl salicylate | 100 |
| Activated clay | 300 |
| Demol-N | 4 |
| Starch | 9 |
| Styrene-butadiene copolymer Latex (solids 50%) | 56 |

A sensitized sheet was obtained by applying each of the above dispersion on a support of 50 g/m$^2$ in weight in an amount of 7 to 10 g/m$^2$ by dry weight according to the same procedure as in Example 1.

For confirming effects of the sensitized sheets of the invention, an upper sheet coated with microcapsules enveloping a color former therein was prepared. The micro-capsules may be prepared in accordance with, for example, U.S. Pat. No. 2,800,457. An embodiment for the preparation is given hereunder.

30 parts of an acid treated gelatin were added to 470 parts of water and dissolved at 60° C. 3 parts of Crystal Violet Lactone were dissolved in 100 parts of isopropylnaphthalene, warmed at 60° C, and added with the above obtained aqueous solution of gelatin, which were then emulsified and dispersed with stirring to form oil droplets with an average particle size of 4 to 5 $\mu$. Next, 300 parts of a 10% aqueous solution of gum arabic were added to the above emulsion, further added with 200 parts of water, and thereafter a pH of the dispersion was adjusted to the range of 4 to 4.5 by adding acetic acid. The dispersion was cooled to 10° C to allow a coacervate film to gel and added with 10 parts of formaldehyde. After ageing for 10 hours a capsule dispersion was formed. An upper sheet was obtained by applying the dispersion on a support paper of 50 g/m$^2$ in weight in an amount of 5 g/m$^2$ by dry weight.

Effects of the sensitized sheets of the invention were confirmed by the manners to follow. A sensitized sheet subjected to the treatments as mentioned hereunder and a sensitized sheet not subjected respective were placed under an upper carrying the encapsulated color former in such a way that the coated surface is in contact with the micro-capsules, and a marking pressure by means of a typewriter was applied. Stabilities of color-forming ability toward heat, light and moisture were observed by differences in density of a developed color image between the treated and untreated sheets a. Allowing a sensitized sheet to stand in surroundings of a 90% relative humidity and temperature of 50° C for 10 hours.

b. Allowing a sensitized sheet to stand in surroundings of 100° C in a temperature for 5 hours.

c. Exposing a sensitized sheet direct to the sun for 3 hours.

Apart from the above tests, a sensitized sheet was brought into close contact with an upper sheet in such a way that the coated surface and the micro-capsules are opposite to each other. After dipping in water the set of sheets was dried and separated to each. In case a sensitized sheet has low resistance toward water, the coated surface of the upper sheet forms a color and thus there arises the "smidge".

The results of the above mentioned tests are given in Table 1.

For confirming stabilities of a developed color image toward light, heat, moisture and water, the following tests were made. The upper sheet was placed over the sensitized sheet in such way that the coated surface and the micro-capsules are opposite to each other, and a marking pressure by means of a typewriter was applied. After standing for 24 hours the sensitized sheet was subject to the treatments to follow and a lowering in density of the color image was observed.

a. Allowing a sensitized sheet to stand in surroundings of a 90% relative humidity and 50° C in a temperature for 10 hours.

b. Allowing a sensitized sheet to stand in surrounding of 100° C in a temperature for 5 hours.

c. Exposing a sensitized sheet direct to the sun for 3 hours.

d. Dipping a sensitized sheet in water and drying at normal temperature.

The results of the above tests are given in Table 1.

Table 1

| | Stability of Color-forming Ability | | | | Stability of Developed Color Image | | | | |
|---|---|---|---|---|---|---|---|---|---|
| Example No. | Moisture Resistance | Thermal Resistance | Light Resistance | Water Resistance | Moisture Resistance | Thermal Resistance | Light Resistance | Water Resistance | Color Intensity of the Image |
| 1 | B | A | A | A | B | A | B | B | A |
| 2-1 | B | A | A | A | B | A | B | B | C |
| -2 | B | A | A | A | B | A | B | B | A |
| -3 | B | A | B | A | B | A | B | B | B |
| -4 | B | A | A | A | B | A | B | B | A |
| -5 | B | A | B | A | B | A | B | B | B |
| -6 | B | A | A | A | B | A | B | B | A |
| -7 | B | A | B | A | B | A | B | B | B |
| -8 | B | A | A | A | B | A | B | B | A |
| -9 | B | A | B | A | B | A | B | B | B |

Table 1-continued

| Example No. | Stability of Color-forming Ability: Moisture Resistance | Thermal Resistance | Light Resistance | Water Resistance | Stability of Developed Color Image: Moisture Resistance | Thermal Resistance | Light Resistance | Water Resistance | Color Intensity of the Image |
|---|---|---|---|---|---|---|---|---|---|
| -10 | B | A | A | A | B | A | B | B | A |
| 2-11 | B | A | A | A | B | A | B | B | A |
| 2-12 | B | A | B | A | B | A | B | B | B |
| 2-13 | B | A | B | A | B | A | B | B | B |
| 2-14 | B | A | A | A | B | A | B | B | A |
| 3-1 | A | A | A | A | A | A | B | B | B |
| -2 | A | A | A | A | A | A | B | B | A |
| -3 | A | A | B | A | A | A | B | B | B |
| -4 | A | A | A | A | A | A | B | B | A |
| -5 | A | A | B | A | A | A | B | B | B |
| -6 | A | A | A | A | A | A | B | B | A |
| -7 | A | A | B | A | A | A | B | B | B |
| 3-8 | A | A | A | A | A | A | B | B | A |
| 3-9 | A | A | B | A | A | A | B | B | B |
| 3-10 | A | A | A | A | A | A | B | B | A |
| 3-11 | A | A | A | A | A | A | B | B | A |
| 3-12 | A | A | B | A | A | A | B | B | B |
| 3-13 | A | A | B | A | A | A | B | B | B |
| 3-14 | A | A | A | A | A | A | B | B | A |
| 4 | B | A | B | A | A | A | B | A | A |
| 5 | B | A | B | A | A | A | B | A | A |
| 6-1 | B | A | A | A | B | A | B | A | B |
| -2 | A | A | A | A | B | A | B | A | A |
| -3 | B | A | A | A | B | A | B | A | B |
| -4 | A | A | A | A | B | A | B | A | A |
| -5 | A | A | A | A | B | A | B | A | A |
| -6 | A | A | A | A | B | A | B | A | A |
| -7 | A | A | A | A | B | A | B | A | A |
| -8 | A | A | A | A | B | A | B | A | A |
| -9 | A | A | A | A | B | A | B | A | A |
| -10 | B | A | A | A | B | A | B | A | B |
| -11 | A | A | A | A | B | A | B | A | A |
| 6-12 | B | A | A | A | B | A | B | A | B |
| -13 | A | A | A | A | B | A | B | A | A |
| -14 | B | A | A | A | B | A | B | A | B |
| 7 | B | A | B | A | A | A | B | A | B |
| 8 | B | A | A | A | A | A | A | A | B |
| 9 | B | A | A | A | B | A | B | A | B |
| 10 | B | A | B | B | B | A | B | A | A |
| 11 | B | A | A | A | B | A | B | A | A |
| 12 | B | A | A | B | B | A | A | B | B |
| 13-1 | B | A | A | A | B | A | B | B | A |
| -2 | A | A | B | A | A | A | B | A | A |
| -3 | A | A | B | A | A | A | B | A | A |
| -4 | B | B | B | A | B | B | B | A | B |
| -5 | B | A | A | A | B | A | A | B | A |
| -6 | B | A | A | A | B | A | B | A | A |
| -7 | A | A | B | A | A | A | B | A | A |
| -8 | B | A | A | A | B | A | B | B | A |
| -9 | B | A | A | A | B | A | A | B | A |
| Control | | | | | | | | | |
| 1 | C | B | B | D | C | B | B | D | C |
| 2 | C | A | B | D | C | A | B | D | B |
| 3 | C | A | B | D | C | A | B | D | A |
| 4 | C | A | B | B | C | A | C | B | A |

Note: Stability of color-forming ability
A: maintained its original color-forming ability
B: scarcely deteriorated
C: remarkably deteriorated
D: entirely deteriorated (color images could not be formed)
Stability of developed color image
A: not changed in color at all
B: scarcely faded
C: remarkably faded
D: faded or discolored
Color intensity of the image
A: high
B: average
C: extremely low

We claim:

1. A sheet material for use in a pressure-sensitive copy system, comprising a support sheet and a coating thereon sensitized to produce color on contact with a chromogenic material, said coating containing a particulate mixture having uniformly dispersed therein in the form of fine powders comprising (a) 100 parts by weight of an acidic organic substance selected from the group consisting of aromatic carboxylic acids and polyvalent metal salts thereof, and (b) from 5 to 300 parts by weight of an organic high molecular compound selected from the group consisting of polystyrene, styrene copolymers, a-methylstyrene polymers, a-methylstyrene copolymers, polyvinyl chloride, vinylchloride copolymers, vinylidenechloride copolymers, polychloroprene, cyclopentadiene polymers, cyclopentadiene copolymers, acrylic ester polymers, acrylic ester copolymers, acrylic acid copolymers, methacrylic ester polymers, methacrylic ester copolymers, methacrylic acid copolymers, vinyl acetate polymers, vinyl acetate copolymers such as ethylene-vinylacetate copolymers, acrylonitrile copolymers, acrylamide copolymers, allylalcohol copolymers, benzylchloride polycondensation products, benzylchloride copolycondensation products, meta-xylene-formaldehyde condensates, diphenyl-formaldehyde condensates, and diphenyl-meta-xylene-formaldehyde copolycondensation products, said organic high molecular compound having a molecular weight of at least 400 and in a non-fluid or solid state at normal temperature, and being compatible with said acidic organic substance.

2. Sheet material according to claim 1, wherein said acidic organic substance has at least 10 carbon atoms in its chemical structure.

3. Sheet material according to claim 1, wherein said acidic organic substance has at least one of 5-membered and 6-membered carbon-rings as substituents and has at least 17 carbon atoms in its chemical structure.

4. Sheet material according to claim 1, wherein said acidic organic substance has at least one hydroxyl group substituted on the carbon atom of the aromatic ring.

5. Sheet material according to claim 1, wherein said acidic organic substance has a hydroxyl group at the orthoposition to the carboxyl group of the aromatic ring.

6. Sheet material according to claim 2, wherein said acidic organic substance has at least one hydroxyl group substituted on the carbon atom of the aromatic ring.

7. Sheet material according to claim 2, wherein said acidic organic substance has a hydroxyl group ortho-position to the carboxyl group of the aromatic ring.

8. Sheet material according to claim 3, wherein said acidic organic substance has at least one hydroxyl group substituted on the carbon atom of the aromatic ring.

9. Sheet material according to claim 3, wherein said acidic organic substance has a hydroxyl group at the ortho-position to the carboxyl group of the aromatic ring.

10. Sheet material according to claim 1, wherein an amount of said organic high molecular compound is within the range of from 15 to 300 parts by weight in respect of 100 parts by weight of said acidic organic substance.

11. Sheet material according to claim 1, wherein said coating material containing the particulate mixture comprising the acidic organic substance and high molecular compound further contains at least one of a water-insoluble inorganic material, in form of particles, selected from the group consisting of inorganic metal compounds and mineral pigments.

12. Sheet material according to claim 11, wherein an amount of said inorganic material is within the range of 1 to 10,000 parts by weight in respect of 100 parts by weight of said organic acidic substance.

13. Sheet material according to claim 11, wherein an amount of said inorganic material is within the range of from 5 to 1,000 parts by weight in respect of 100 parts by weight of said organic acidic substance.

14. Sheet material according to claim 11, wherein said inorganic material is present in mixture with the particulate mixture comprising the organic acidic substance and high molecular compound.

15. Sheet material according to claim 11, wherein said inorganic material is present in mixture with said particulate mixture in a weight ratio of not more than 2,000 parts to 100 parts of said organic acidic substance.

16. Sheet material according to claim 11, wherein said inorganic metal compounds are selected from the group consisting of metal oxides, hydroxides and carbonates wherein said metal is selected from the group consisting of zinc, aluminum, calcium, magnesium, titanium, nickel, cobalt, manganese, tin, chromium and vanadium.

17. Sheet material according to claim 11, wherein said mineral pigments are selected from the group consisting of activated clay, acid clay, kaolin, talc, benzonite, aluminum silicate, zinc silicate, barium sulfate and silicagel.

18. Sheet material according to claim 1, wherein a powdered organic material is present in mixture with the particulate mixture comprising the organic acidic substance and high molecular compound.

19. Sheet material according to claim 1, wherein at least one of aliphatic carboxylic acids and polyvalent metal salts thereof is further present in mixture with the particulate mixture comprising the said organic acidic substance and said high molecular compound.

20. Sheet material according to claim 1, wherein said organic high molecular compound is selected from the group consisting of polystyrene, styrene-α-methylstyrene copolymer and poly-α-methylstyrene.

21. Sheet material according to claim 5, wherein said aromatic carboxylic acids are represented by the following general formula:

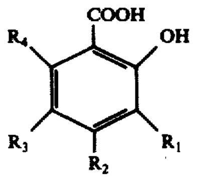

wherein $R_1$, $R_2$, $R_3$ and $R_4$ each represents hydrogen, halogen or hydroxyl, amino, carboxyl, carbamoyl, N-substituted carbamoyl, alkyl, cycloalkyl, aryl, aryloxy, aralkyl or an alkaryl group.

* * * * *